455-296 SR CROSS REFERENCE SEARCH ROOM
FIP8106 XR 3,429,999
32E
Feb. 25, 1969 H. A. STOVER 3,429,999
CIRCUIT FOR PREVENTING SINGING IN AUDIO SYSTEMS
Filed Sept. 6, 1966
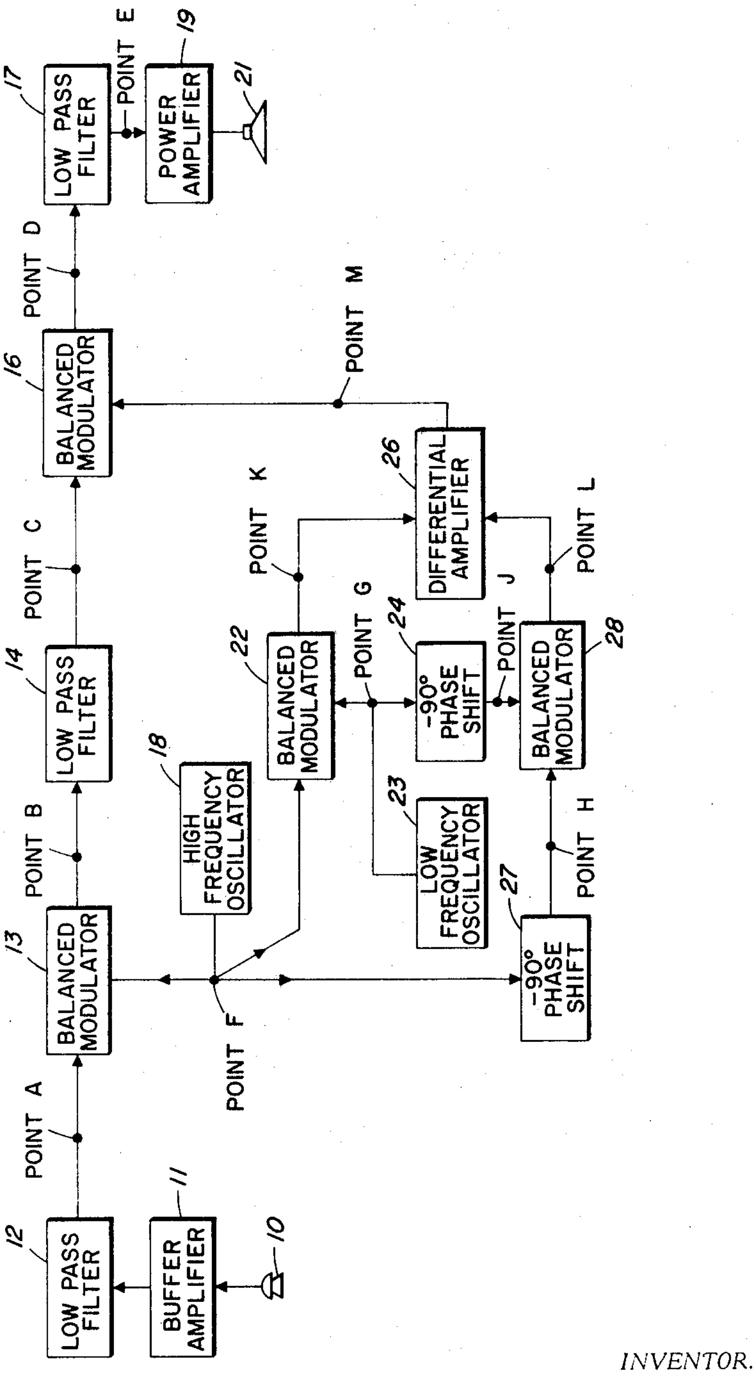
INVENTOR.
HARRIS A. STOVER
BY [signature]
ATTORNEY
3429999
OR IN 179/1R United States Patent Office
3,429,999
Patented Feb. 25, 1969

3,429,999
CIRCUIT FOR PREVENTING SINGING IN AUDIO SYSTEMS

Harris A. Stover, Cedar Rapids, Iowa, assignor to Collins Radio Company, Cedar Rapids, Iowa, a corporation of Iowa Filed Sept. 6, 1966, Ser. No. 577,469
U.S. Cl. 179—1 9 Claims
Int. Cl. H04m *1/20;* H03f *1/00*

ABSTRACT OF THE DISCLOSURE

An audio amplifying system which offsets the frequency from the loudspeaker so as to prevent oscillation caused by the loudspeaker output feeding into the microphone.

This invention relates in general to a system for preventing singing in audio systems and in particular to a mixing scheme which eliminates singing caused by feedback from the loudspeaker to the microphone.

As is well known, audio systems are generally limited by the amount of amplification which can be obtained due to oscillation which occurs due to feedback from the speaker to the microphone and amplifier. When this occurs, the amplifier becomes saturated at the oscillating frequency and a loud ring or sing is the only audio signal. This renders the system inoperative.

It is an object of the present invention to provide an audio amplifying system which offsets the frequency from the loudspeaker so as to prevent oscillation caused by the loudspeaker output feeding into the microphone.

It is another object of this invention to provide an improved audio amplifying system.

A feature of this invention is found in the provision for a method of offsetting the frequency of the signal received at the microphone before supplying it to a speaker so as to eliminate oscillations.

Further objects, features, and advantages of this invention will become apparent from the following description and claims when read in view of the accompanying figure, in which:

The figure illustrates an audio amplifying system according to this invention.

The figure illustrates a microphone 10 which supplies an input to a buffer amplifier 11. A low pass filter 12 restricts the highest voice frequency of the signal before feeding it to a balanced modulator or mixer 13. The balanced modulator 13 also receives an input from high frequency oscillator 18. The output of balanced modulator 13 is passed through low pass filter 14 to balanced modulator or mixer 16. Balanced modulator 16 also receives an input from differential amplifier 26. Another low pass filter 17 receives the output of balanced modulator 16 and supplies an output to an audio power amplifier 19. A loudspeaker 21 is connected to the amplifier 19.

A balanced modulator or mixer 22 receives an output from high frequency oscillator 18 and also from low frequency oscillator 23. Another balanced modulator or mixer 28 also receives outputs from high frequency oscillator 18 and low frequency oscillator 23 after they have been shifted 90 degrees in phase by phase shifters 27 and 24. The outputs of balanced modulators 22 and 28 are fed to the differential amplifier 26. The output of differential amplifier 26 is fed to balanced modulator 16.

It should be realized that a balanced modulator is a device with an output equal to the product of its two inputs. Let S cos $2\pi f_v t$ represent the input to the system from the microphone 10 with $f_v$ representing any frequency components of the voice frequency range. Let cos $2\pi f_h t$ be the output from high frequency oscillator 18. The frequency of this oscillator is just above the cutoff frequency of low pass filters 12 and 14 but it does not require high stability. Let cos $2\pi f_1 t$ be the output of low frequency oscillator 23. Since this will be the offset frequency, it should be quite low so as not to disturb the voice quality, say in the range of 5 to 20 cycles per second.

At point B, the output of modulator 13, the signal is the product of the signals at points A and F. Thus, at point B:

$$[S \cos 2\pi f_v t][\cos 2\pi f_h t] = \frac{S}{2} \cos 2\pi (f_h + f_v)t + \frac{S}{2} \cos 2\pi (f_h - f_v)t$$

Since the sum term is higher in frequency than $f_h$, it is removed by low pass filter 14 leaving $$\frac{S}{2} \cos 2\pi (f_h - f_v)t$$

at point C which serves as one of the inputs to balanced modulator 16.

At point K, the output of balanced modulator 22, the signal is the product of the signals at points F and G. At point K:

$$[\cos 2\pi f_1 t][\cos 2\pi f_h t] = \frac{1}{2} \cos 2\pi (f_h + f_1)t + \frac{1}{2} \cos 2\pi (f_h - f_1)t$$

Similarly, at point L, the output of balanced modulator 28, the signal is the product of the signals at points H and J.

At point L:

$$\left[\cos\left(2\pi f_1 t - \frac{\pi}{2}\right)\right]\left[\cos\left(2\pi f_h t - \frac{\pi}{2}\right)\right] = \frac{1}{2} \cos [2\pi (f_h + f_1)t - \pi] + \frac{1}{2} \cos [2\pi (f_h - f_1)t]$$

At point M, the output of differential amplifier 26, the signal is the difference between the signals at points K and L. Thus, the signal at point M is cos $2\pi(f_h + f_1)t$.

At point D, the output of balanced modulator 16, the signal is the product of the signals at points C and M. At point D:

$$\left[\frac{S}{2} \cos 2\pi (f_h - f_v)t\right] [\cos 2\pi (f_h + f_1)t] = \frac{S}{4} \cos 2\pi (2f_h - f_v + f_1)t + \frac{S}{4} \cos 2\pi (f_1 + f_v)t$$

Since the sum term at point D is higher in frequency than $f_h$, it is removed by low pass filter 17 leaving only the difference term at point E. Thus, the output is given by K cos $2\pi(f_1 + f_v)t$, where the constant K allows for amplifier gain, and the output frequency of all voice frequencies will be increased by the frequency of the low frequency oscillator. Since the frequency of the high frequency oscillator 18 cancels out, it does not require a high degree of frequency stability. However, it must maintain a relationship with the low pass filters so that the unwanted upper sidebands are removed by the filters. Any drift in the low frequency oscillator 23, which is the offset frequency, will produce little noticeable effect.

Although negative 90 degree phase shifts have been shown in both phase shifters 24 and 27, positive phase shifts could be used in both with identical results. If one of them is positive and one is negative, however, the output frequency will be lowered by $f_1$ instead of being raised by $f_1$.

Although this invention has been described with respect to a particular embodiment thereof, it is not to be so limited, as changes and modifications may be made therein which are within the spirit and scope of the invention as defined by the appended claims.

I claim:

1. A system for eliminating singing in an amplifying system comprising a pickup transducer, a first mixer receiving the output of the pickup transducer, a first oscillator supplying an input to the input of the first mixer, a second mixer receiving an input from the first oscillator, a first ninety-degree phase shift circuit receiving an input from the first oscillator, a third mixer receiving an input from the first phase shift circuit, a second oscillator supplying an input to the second mixer, a second ninety-degree phase shift circuit receiving an input from the second oscillator and supplying an input to the third mixer, a differential amplifier receiving the outputs of the second and third mixers, and a fourth mixer receiving the outputs of the differential amplifier and first mixer.

2. In apparatus according to claim 1, an electrical sound transducer connected to the output of the fourth mixer.

3. In apparatus according to claim 2, a first low pass filter connected between the pickup transducer and the first mixer, a second low pass filter connected between the first and fourth mixers, and a third low pass filter connected between the fourth mixer and the electrical to sound transducer.

4. In apparatus according to claim 1, wherein the first and second ninety-degree phase shift circuits shift the phase of their input signals in the same direction.

5. In apparatus according to claim 1, where the ninety-degree phase shift circuits shift the input signals by positive ninety degrees.

6. In apparatus according to claim 1, where the first and second phase shift circuits shift the input signals by a negative ninety degrees.

7. In apparatus according to claim 1, wherein the first, second, third and fourth mixers are balanced modulators.

8. In apparatus according to claim 1, wherein the first oscillator is a high frequency oscillator and the second oscillator is a low frequency oscillator.

9. In apparatus according to claim 1, wherein the first and second ninety-degree phase shift circuits shift the phase of their inpunt signals in the opposite direction.

References Cited

UNITED STATES PATENTS

| | | | |
|---|---|---|---|
| 2,157,178 | 5/1939 | Kellogg | 179—1 |
| 2,421,727 | 6/1947 | Thompson. | |
| 2,723,316 | 11/1955 | Goodell et al. | 179—1 X |
| 2,875,328 | 2/1959 | Hare et al. | 325—12 X |
| 3,105,877 | 10/1963 | Miller et al. | 179—1 |

FOREIGN PATENTS

| | | | |
|---|---|---|---|
| 601,990 | 5/1948 | Great Britain. | |

KATHLEEN H. CLAFFY, *Primary Examiner.*

VAN C. WILKS, *Assistant Examiner.*

U.S. Cl. X.R.

330—151; 325—12